(12) United States Patent
Kaviani et al.

(10) Patent No.: US 8,817,863 B2
(45) Date of Patent: Aug. 26, 2014

(54) LINEAR EQUALIZER WITH PASSIVE NETWORK AND EMBEDDED LEVEL SHIFTER

(75) Inventors: Kambiz Kaviani, Palo Alto, CA (US); Jason Chia-Jen Wei, San Jose, CA (US); Farshid Aryanfar, Allen, TX (US)

(73) Assignee: Rambus Inc., Sunnyvale, CA (US)

( * ) Notice: Subject to any disclaimer, the term of this patent is extended or adjusted under 35 U.S.C. 154(b) by 337 days.

(21) Appl. No.: 13/357,736

(22) Filed: Jan. 25, 2012

(65) Prior Publication Data

US 2012/0200375 A1 Aug. 9, 2012

Related U.S. Application Data

(60) Provisional application No. 61/441,049, filed on Feb. 9, 2011.

(51) Int. Cl.
*H03H 7/30* (2006.01)

(52) U.S. Cl.
USPC ........... 375/229; 375/230; 375/232; 375/259; 375/316; 375/343

(58) Field of Classification Search
CPC ............ H04L 25/028; H04L 25/03343; H04L 25/061; H04L 25/0292; H04L 25/03057; H04L 25/4906; H04L 2025/03363; H04L 2025/03802; H04L 25/0282; H04L 25/4917; H04L 25/03885; H04B 1/04; H04B 1/0475
USPC ......... 375/211, 219, 229, 230, 232, 259, 316, 375/324, 343
See application file for complete search history.

(56) References Cited

U.S. PATENT DOCUMENTS

| | | | |
|---|---|---|---|
| 5,124,673 A * | 6/1992 | Hershberger | .................... 333/18 |
| 5,963,110 A * | 10/1999 | Ihara et al. | ................... 333/28 R |
| 6,724,839 B1 | 4/2004 | Chan et al. | |
| 7,199,615 B2 * | 4/2007 | Stojanovic et al. | ............. 326/82 |
| 7,586,987 B2 | 9/2009 | Vorenkamp et al. | |
| 7,656,939 B2 * | 2/2010 | Gondi et al. | ................... 375/229 |
| 2004/0071219 A1 * | 4/2004 | Vorenkamp et al. | .......... 375/257 |
| 2005/0078780 A1 * | 4/2005 | Chou et al. | ..................... 375/350 |
| 2006/0088086 A1 * | 4/2006 | Gondi et al. | ................... 375/229 |
| 2006/0088087 A1 * | 4/2006 | Gondi et al. | ................... 375/229 |
| 2007/0230640 A1 * | 10/2007 | Bryan et al. | ................... 375/349 |
| 2008/0238588 A1 | 10/2008 | Yeung et al. | |
| 2008/0304557 A1 * | 12/2008 | Hollis | ........................... 375/231 |

(Continued)

OTHER PUBLICATIONS

Kaviani, et al. "A 0.4mW/Gb/s 16Gb/s Near-Ground Receiver Front-End with Replica Transconductance Termination Calibration", 2012 IEEE International Solid-State Circuits Conference Digest of Technical Papers (ISSCC), pp. 132-134, Session 7, Feb. 19-23, 2012. 3 pages.

*Primary Examiner* — Hirdepal Singh (57) ABSTRACT

The disclosed embodiments relate to the design of a linear equalizer that supports low-power, high-speed data transfers. In some embodiments, this linear equalizer contains a passive network that provides selective frequency peaking in a frequency range associated with a falling edge of a frequency response of the channel. It also includes a level shifter coupled between the channel and the passive network, wherein the level shifter is an active component that provides amplification and/or level-shifting. Moreover, the linear equalizer is designed so that power from the level shifter facilitates the selective frequency peaking of the passive network.

31 Claims, 8 Drawing Sheets

(56) References Cited

U.S. PATENT DOCUMENTS

| | | |
|---|---|---|
| 2010/0019848 A1 | 1/2010 | Rossi |
| 2010/0046683 A1* | 2/2010 | Beukema et al. ............. 375/355 |
| 2010/0141340 A1* | 6/2010 | Huang et al. .................. 330/253 |
| 2010/0266006 A1* | 10/2010 | Werner et al. ................. 375/232 |
| 2012/0106539 A1* | 5/2012 | Ferraiolo et al. .............. 370/351 |
| 2012/0133414 A1* | 5/2012 | Zhuang ......................... 327/333 |
| 2012/0263223 A1* | 10/2012 | Rajaee et al. ................. 375/232 |

* cited by examiner

LINEAR EQUALIZER WITH PASSIVE NETWORK AND EMBEDDED LEVEL SHIFTER

RELATED APPLICATION

This application claims priority to U.S. Provisional Application No. 61/441,049, entitled "Linear Equalizer with Passive Network and Embedded Level Shifter," by inventors Kambiz Kavlani, Jason chia-Jen Wei and Farshid Aryanfar, filed 9 Feb. 2011, the contents of which are incorporated herein by reference.

BACKGROUND

Field

The disclosed embodiments generally relate high-speed signaling and more specifically to a linear equalizer.

DETAILED DESCRIPTION

The disclosed embodiments relate to the design of a linear equalizer, for example, such as one included in a receiver of an integrated circuit device, that supports low-power, high-speed data transfers across a communication channel. This linear equalizer contains a passive network that facilitates high-speed data transfers by providing selective frequency peaking in a frequency range associated with a falling edge at a higher end of a frequency response of the channel. Hence, the passive network effectively provides high-frequency gain, while lower frequency components are untouched.

The linear equalizer, in an embodiment, also includes a level shifter coupled between the channel and the passive network, wherein the level shifter is an active component that provides amplification and/or voltage level-shifting. Moreover, power from the level shifter is used to facilitate the selective frequency peaking of the passive network. In this way, level-shifting power is recycled to perform equalization operations for communications across the channel.

This passive network, in an embodiment, is designed to provide constant peaking across different process, voltage and temperature (PVT) conditions. Moreover, there is no need for calibration because the passive network uses a ratio between passive components (e.g., resistors) instead of active components to facilitate the peaking. Moreover, the passive network can be used without a level shifter in applications where there exists a very sensitive receiver and no gain or level shifting is required. However, in other embodiments, the passive network is combined with a level shifter that recycles power to facilitate the peaking as is described in more detail below.

In some embodiments, the level shifter includes a transconductance device, wherein the transconductance device is biased with respect to a conductance component of the passive network through a feedback mechanism, and wherein the biasing facilitates constant peaking across a frequency range of interest.

In some embodiments, the passive network implements a second order (or higher) filter. For example, the second order filter can be an RC filter, or alternatively, an equivalent RL filter. (The equivalent $R_L$ filter can be obtained by generating a Thevenin equivalent $R_L$ filter from the $R_C$ filter.) More generally, the passive network can include a second order, third order, or higher filter comprised of passive components, such as resistive, capacitive and inductive components. In some embodiments (such as the embodiment illustrated in FIG. 2), the second order filter is a capacitor input ($\pi$ RC) filter.

Hence, the above-described system provides: (1) improved power efficiency; (2) precise gain characteristics in the presence of PVT variations; and (3) constant peaking in a high-frequency range (e.g., from 16 GHz to 32 GHz). Note that the precision (which is related to calibration) and the power efficiency are somewhat independent. The power efficiency results from combining level-shifting and filtering functions in one block, whereas the precision results from controlling the peaking by using resistive ratios which remain relatively constant over a range of PVT values.

Implementation details for this linear equalizer are described in more detail below, but first we describe a system that uses the linear equalizer.

System

Figure 1:
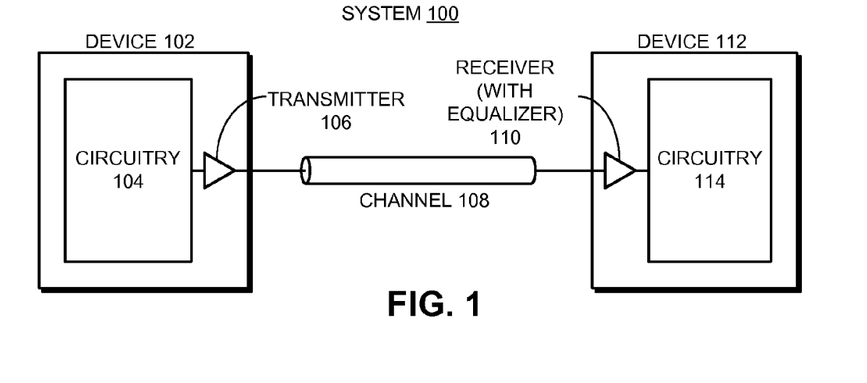
FIG. 1 illustrates a transmitter and a receiver in accordance with the disclosed embodiments.

FIG. 1 illustrates an exemplary system 100 which uses a linear equalizer in accordance with the disclosed embodiments. System 100 can generally include any type of communication system in which a transmitter 106 communicates with a receiver 110 through a communication channel 108. In one embodiment, system 100 is a computer system comprised of integrated circuit devices and communication channel 108 is a bus line which connects different integrated circuit devices. As illustrated in FIG. 1, a first integrated circuit device 102 includes internal circuitry 104 which transmits data through a transmitter 106 onto communication channel 108. Next, a receiver 110 within a second integrated circuit device 112 receives the transmitted signal and communicates the received signal to internal circuitry 114 within the second integrated circuit device 112.

This receiver 110 includes a linear equalizer comprising a combined passive network and level shifter as will be described in more detail below. However, note that the passive network can also be incorporated into a transmitter, such as transmitter 106, to facilitate equalization operations. This linear equalizer circuit is described in more detail below.

The system 100 illustrated in FIG. 1 can generally be part of a computer system, which can include any type of system or electronic device with computational capability, such as a server computer system, a desktop computer system, a laptop computer system, a notebook computer system, a tablet computer system, a personal digital assistant, a cellular telephone or a portable navigation system. For example, the system in FIG. 1 can be part of a memory system for a computer, wherein the first integrated circuit device 102 includes a memory controller, the second integrated circuit device 112 is a memory device, and communication channel 108 is part of a memory bus which connects the memory controller to the memory device. Moreover, communication channel 108 can be an inter-chip communication channel that connects different semiconductor devices, or alternatively can be an on-chip communication channel that connects different circuits within a semiconductor chip. Communication channel 108 can also be a serial communication link within a system, or can be part of a link that connects a peripheral or video device to a system. Channel 108 is also associated with a transmitter 106 and a receiver 110, wherein the receiver (or possibly the transmitter) can be associated with an equalizer.

Linear Equalizer

Figure 2:
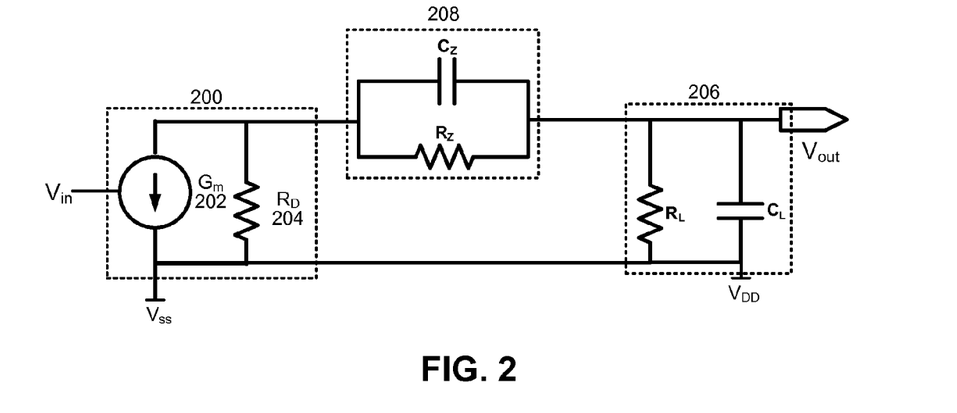
FIG. 2 illustrates an exemplary linear equalizer comprising a passive network with an embedded level shifter in accordance with the disclosed embodiments.

FIG. 2 illustrates an exemplary linear equalizer comprising a passive network with an embedded level shifter 200 in accordance with the disclosed embodiments. More specifically, the level shifter 200 comprises a transconductance device in the form of a voltage-controlled current source $G_m$ 202, wherein the current through $G_m$ 202 is controlled by a voltage input signal $V_{in}$. The level shifter 200 also includes a resistive element $R_D$ 204, wherein $R_D$ 204 and $G_m$ 202 are coupled in series between supply voltage $V_{DD}$ and $V_{SS}$ which commonly is ground. During low-frequency operation, most of the current pulled by current source $G_m$ 202 flows through $R_D$ 204 because the resistance is higher through the alternative pathway through the passive network at lower frequencies.

The passive network comprises first impedance network 206 connected in series with a second impedance network 208 between $V_{DD}$ and the transconductance device $G_m$ 202. Moreover, the first impedance network comprises a resistive element $R_L$ connected in parallel with an output load capacitance $C_L$, and the second impedance network comprises a resistive element $R_Z$ connected in parallel with a capacitance $C_Z$. Finally, the output of the equalizer $V_{out}$ is taken from a junction between the first impedance network and the second impedance network. During high-frequency operation, the passive network (comprising the first impedance network 206 and the second impedance network 208) has a lower resistance. Consequently, most of the current pulled by current source $G_m$ 202 flows through the passive network. Moreover, $R_Z$ and $C_Z$ are sized so that the second impedance network 208 is effectively shorted at higher frequencies. Hence, at higher frequencies, the passive network effectively "steals" the current going to the output load $R_D$ and uses this current to boost the gain of the equalizer.

Frequency Response

Figure 3:
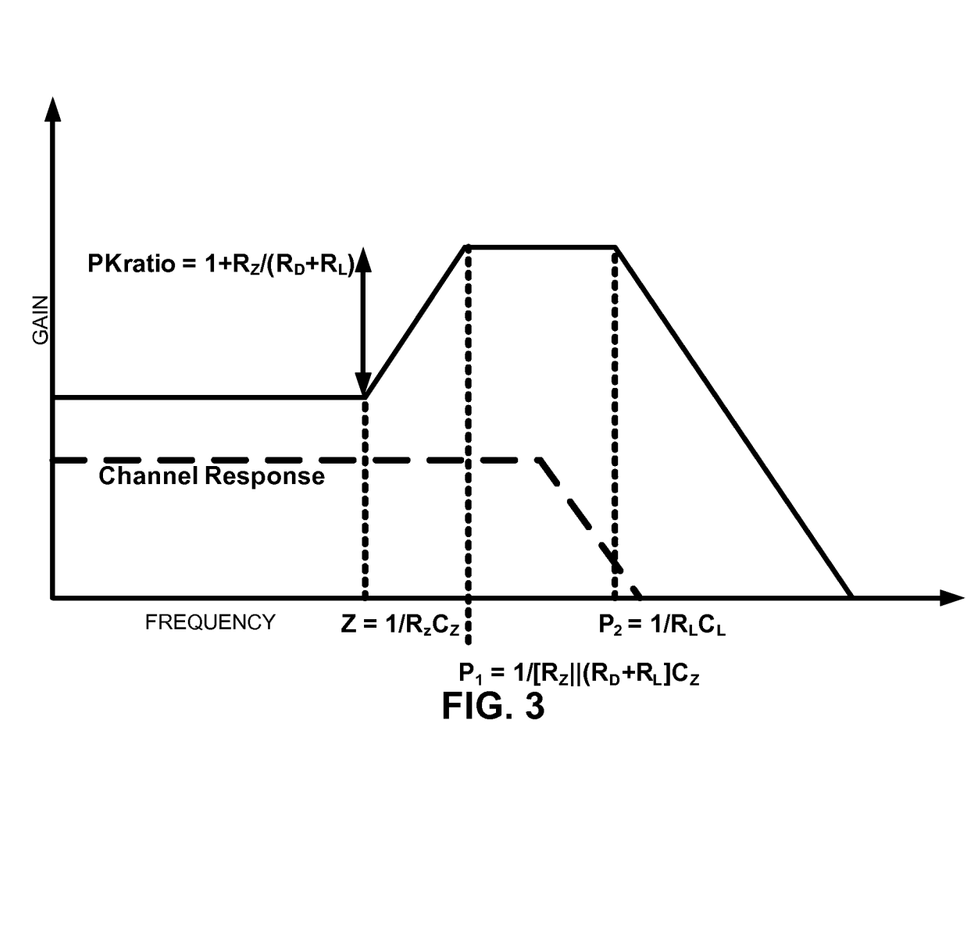
FIG. 3 illustrates the frequency response of the linear equalizer illustrated in FIG. 2 in accordance with the disclosed embodiments.

FIG. 3 illustrates the frequency response of the linear equalizer circuit illustrated in FIG. 2 in accordance with the disclosed embodiments. More specifically, the graph in FIG. 3 represents gain as a function of frequency for the circuit illustrated in FIG. 2. As mentioned above, during low-frequency operation, up to a frequency of $Z=1/R_Z C_Z$, most current flows through resistance $R_D$ 204 and the gain is relatively flat. Next, the gain increases from a frequency of Z up to $P_1=1/([R_Z \| (R_D+R_L)]C_Z)$. Then, the gain remains relatively flat from $P_1$ to $P_2=1/R_L C_L$, after which the output capacitance $C_L$ causes the gain to fall off. This linear equalizer provides selective frequency peaking in a frequency range associated with a falling edge of a frequency response of the channel. By boosting the frequency response at approximately the falling edge, the equalizer effectively allows higher frequency components to be transmitted through the channel. Moreover, the frequencies associated with the zero Z and the poles $P_1$ and $P_2$ can be set by appropriately sizing $R_D$, $R_Z$, $C_Z$ and $R_L$. In order to achieve constant peaking as illustrated in FIG. 3, the passive network system requires two or more poles. Hence, to achieve constant peaking, the passive network is preferably second order or higher.

More-Detailed Schematic

Figure 4:
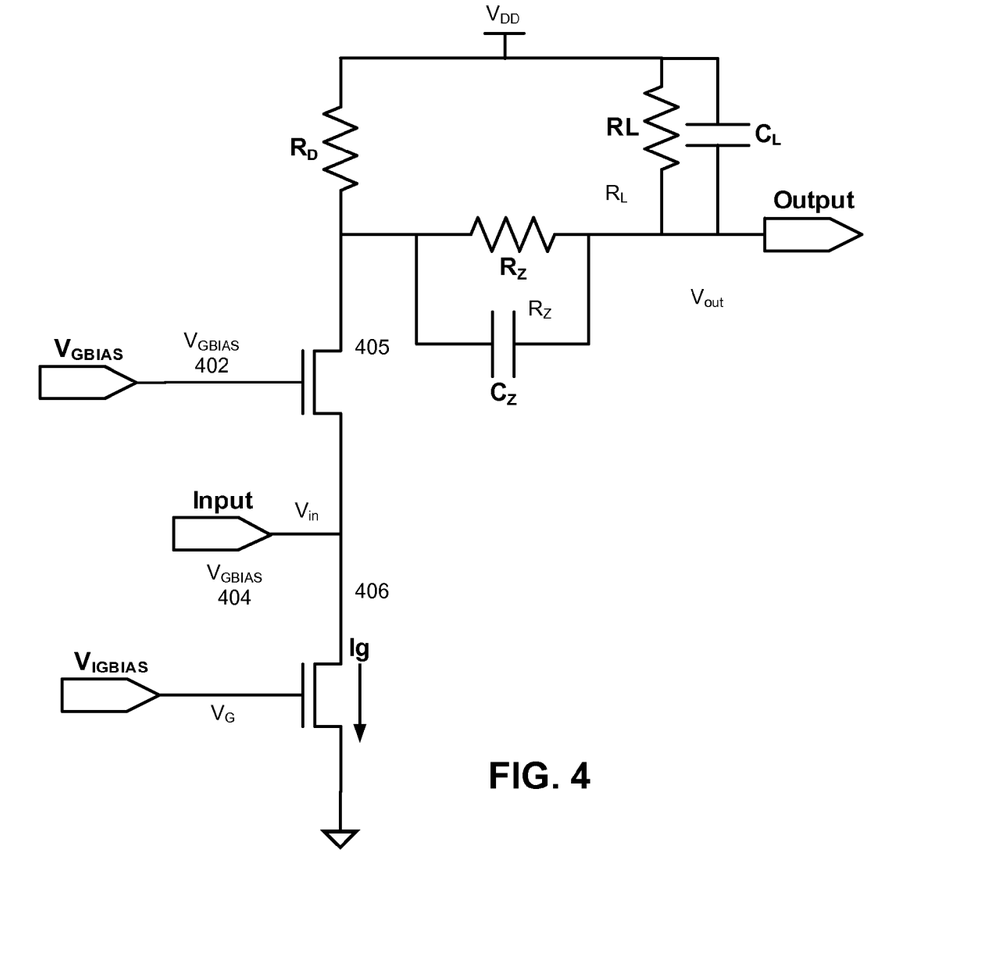
FIG. 4 provides a more-detailed schematic of the linear equalizer illustrated in FIG. 2 in accordance with the disclosed embodiments.

FIG. 4 provides a more-detailed schematic of the linear equalizer illustrated in FIG. 2 in accordance with the disclosed embodiments. This diagram is similar to the diagram illustrated in FIG. 2, except that the current-controlled voltage source $G_m$ 202 in FIG. 2 is illustrated in more detail. As illustrated in FIG. 4, the current-controlled voltage source can be implemented using two N-type transistors 405 and 406 which are connected in parallel, wherein the input to the linear equalizer $V_{in}$ is coupled to the junction between transistors 405 and 406. Moreover, transistors 405 and 406 are biased using two bias signals $V_{GBIAS}$ 402 and $V_{IGBIAS}$ 404, which are generated in a manner that facilitates a constant gain in a frequency range of interest. This biasing circuit is described in more detail below with reference to FIG. 5.

Biasing Circuit

Figure 5:
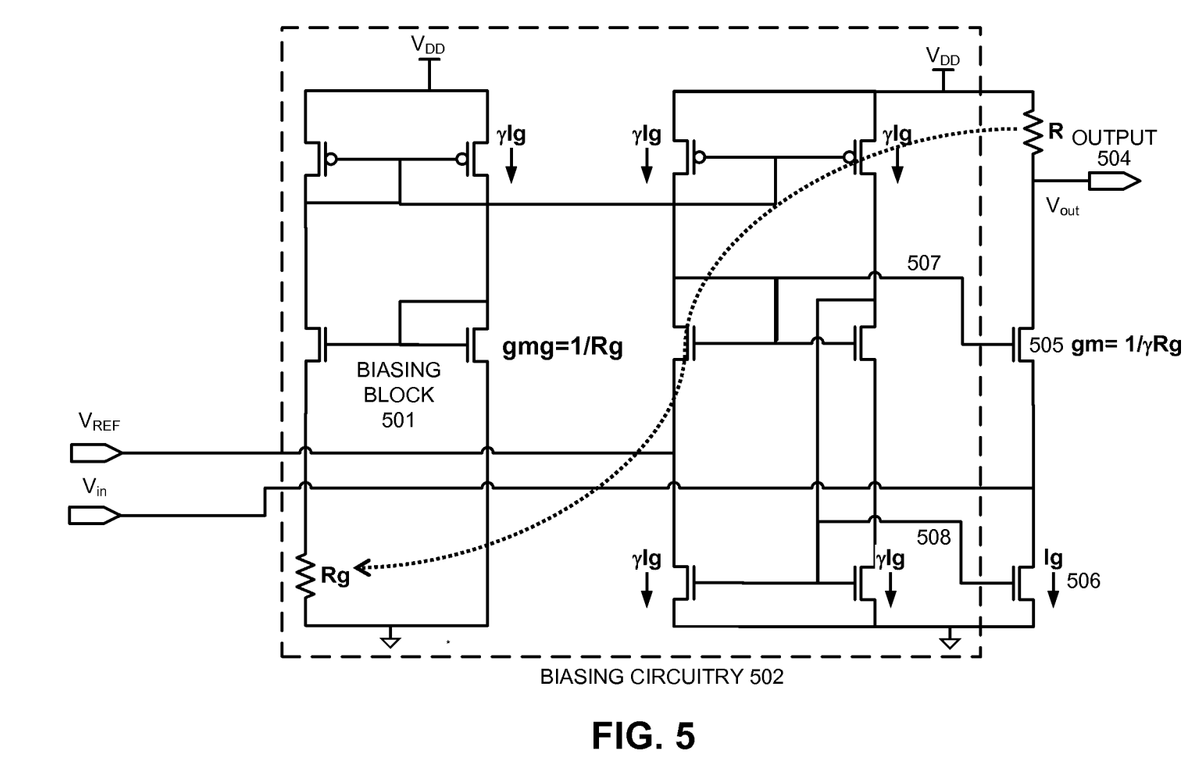
FIG. 5 illustrates an exemplary biasing circuit for the linear equalizer in accordance with the disclosed embodiments.

FIG. 5 illustrates an exemplary biasing circuit 502 for the linear equalizer in accordance with the disclosed embodiments. More specifically, FIG. 5 illustrates a voltage-controlled current source comprised of two N-type transistors 505 and 506, which are connected in series with a resistance R between $V_{DD}$ and ground. A voltage input to the circuit $V_{in}$ is coupled to the junction between transistors 505 and 506, and the gates of transistors 505 and 506 are biased with signals 507 and 508 produced by biasing circuitry 502. Note that resistance R represents a combined impedance of the passive circuit elements $R_D$, $R_Z$ and $R_L$ illustrated in FIG. 4. Hence, R is effectively a function of $R_D$, $R_Z$ and $R_L$.

The gain of the voltage-controlled current source comprised of transistors 505 and 506 coupled to resistance R can be expressed as gain=$g_m \times R$. Moreover, biasing block 501 within biasing circuitry 502 is configured so that the gain of biasing block 501 is $1/R_g$. The rest of biasing circuitry 502 outside of biasing block 501 acts as a current mirror which generates an equivalent gain for transistors 505 and 506 with respect to a reference voltage $V_{REF}$. Using this voltage reference $V_{REF}$ reduces common-mode voltage problems. Finally, note that if $R_g$ is set to be equivalent to R, the gain through transistors 505 and 506 will be relatively flat. Hence, $R_g$ functions as a "replica load" which can be matched with R to achieve the desired flat gain. Note that the optimal resistance value $R_g$ can be determined empirically for a specific implementation and application, and then the circuit can be configured with this optimal value.

Differential Version

Figure 6:
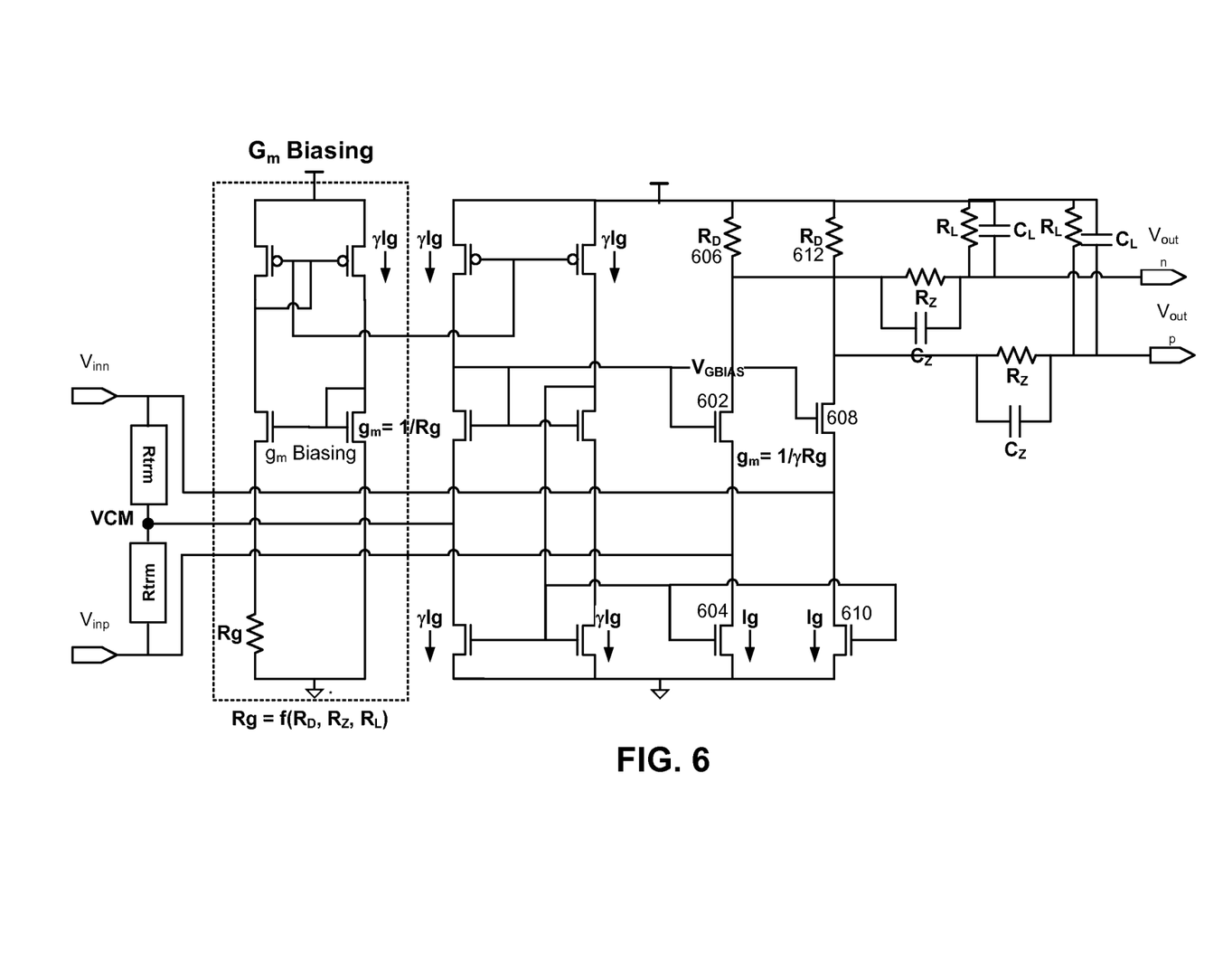
FIG. 6 illustrates a differential version of the linear equalizer in accordance with the disclosed embodiments.

FIG. 6 illustrates a differential version of the linear equalizer and associated biasing circuitry in accordance with the disclosed embodiments. Instead of receiving a single input signal $V_{in}$ and generating a single output signal $V_{out}$ as in the single-ended version illustrated in FIG. 4, the differential version illustrated in FIG. 6 receives differential input signals $V_{inn}$ and $V_{inp}$ and generates differential output signals $V_{outn}$ and $V_{outp}$. The biasing circuitry is the same as the biasing circuitry illustrated in FIG. 5, except that the biasing circuitry drives two separate level shifters, including a first level shifter coupled to $V_{inp}$ comprising N-type transistors 602 and 604 connected in series with resistor $R_D$ 606, and a second level shifter coupled to $V_{inn}$ comprising N-type transistors 608 and 610 connected in series with resistor $R_D$ 612. As illustrated in FIG. 6, these two level shifters are coupled to separate passive networks comprising $R_Z, C_Z, R_L$ and $C_L$ components.

Figure 7:
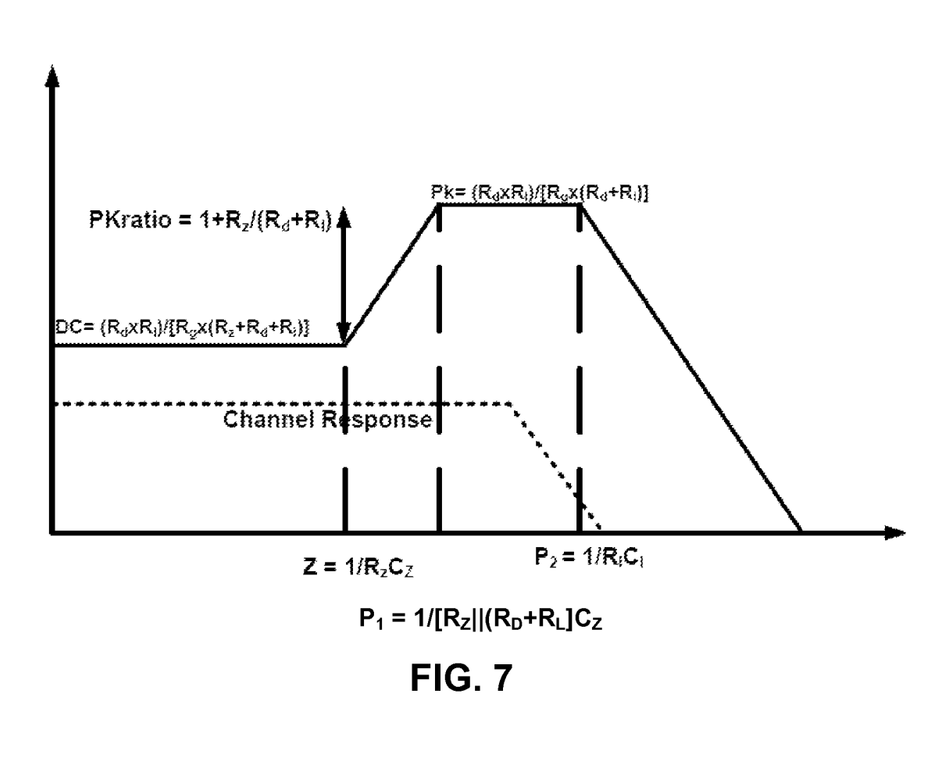
FIG. 7 illustrates the frequency response of the linear equalizer illustrated in FIG. 6 in accordance with the disclosed embodiments.

FIG. 7 illustrates the frequency response of the linear equalizer illustrated in FIG. 6 in accordance with the disclosed embodiments. This frequency response has a similar shape to the frequency response illustrated in FIG. 3. However, the additional circuitry changes some parameters for the response curve.

Operations Involved in Equalization

Figure 8:
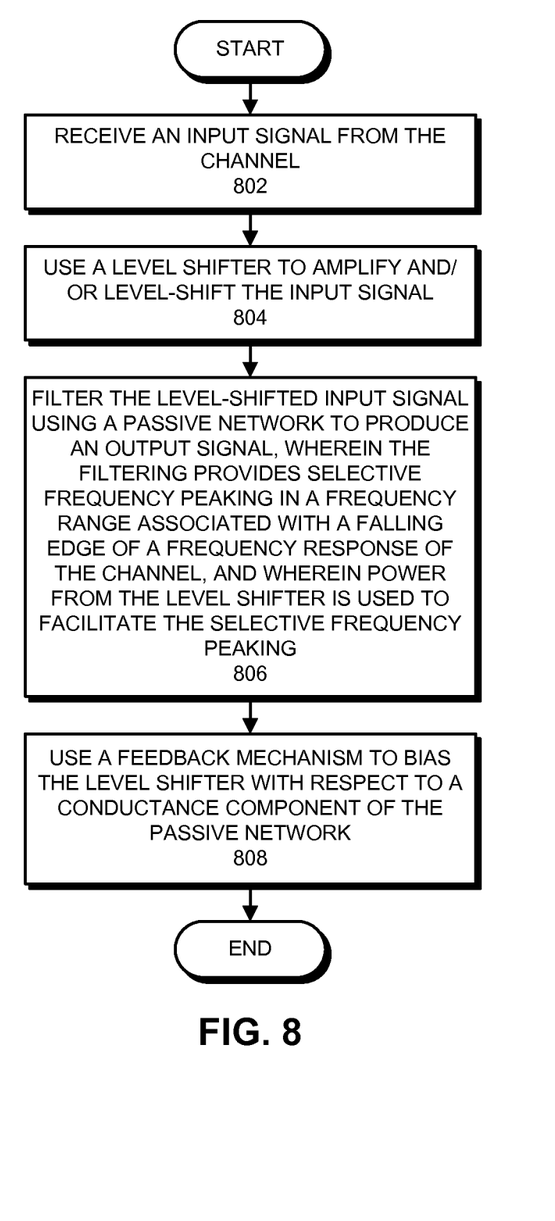
FIG. 8 presents a flow chart illustrating the operations involved in the equalization process in accordance with the disclosed embodiments.

FIG. 8 presents a flow chart illustrating the operations involved in the equalization process in accordance with the disclosed embodiments. First, the system receives an input signal from the communication channel (step 802). Next, the system uses a level shifter to amplify and/or level-shift the input signal (step 804). The system then filters the level-shifted input signal to provide selective frequency peaking in a frequency range associated with a falling edge of a frequency response of the channel. During this process, power from the level shifter is used to facilitate the selective frequency peaking of the passive network (step 806). Also, during the level shifting and filtering processes, a feedback mechanism is used to bias the level shifter with respect to a conductance component of the passive network (step 808).

PVT Variations

Figure 9A:
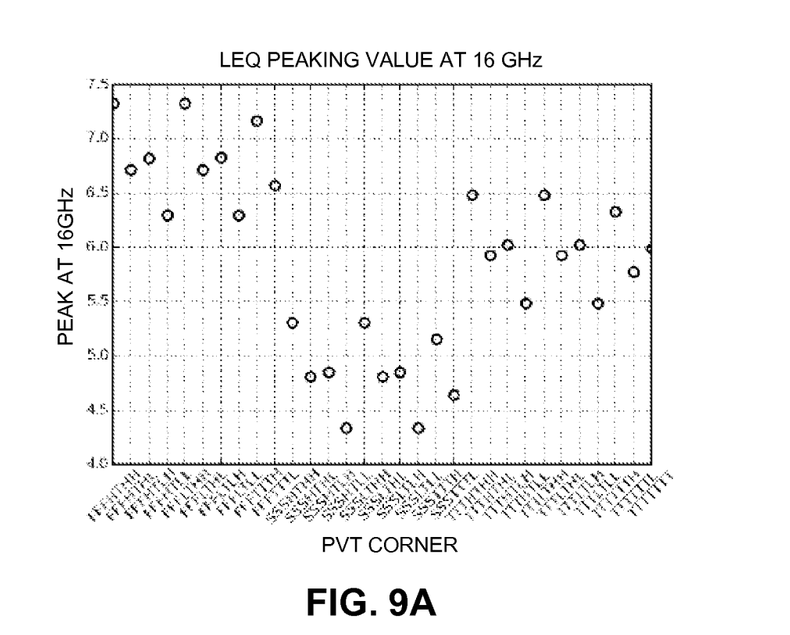
FIG. 9A illustrates peaking values for different PVT corners in accordance with the disclosed embodiments.
Figure 9B:
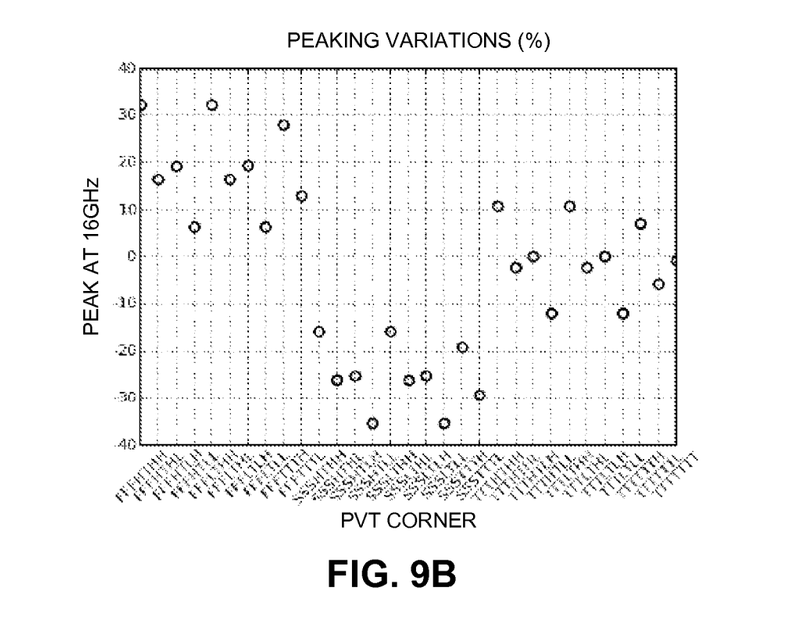
FIG. 9B illustrates peaking percentage variations for different PVT corners in accordance with the disclosed embodiments.

FIG. 9A presents a graph illustrating peaking values for different process, voltage and temperature (PVT) corners in an exemplary implementation operating at 16 GHz in accordance with the disclosed embodiments. As can be seen from the graph, the average peaking amplitude is approximately 6 dB. Moreover, there is some amount of variation in the peaking amplitudes, which range from between 4.3 dB and 7.4 dB. FIG. 9B presents a graph illustrating corresponding peaking percentage variations for the different PVT corners (assuming an average peaking value of 6 dB). This graph indicates that the corresponding peaking variation ranges between +31% to −36%.

In accordance with various embodiments presented herein, a linear equalizer effectively provides a no-power solution with ideal power savings as well as accurate and robust performance over a range of PVT parameters. The linear equalizer may be suited for an integrated circuit transmitter or receiver in, for example, mobile compute, or other applications. The linear equalizer employs a passive network including, but not limited to, resistors and capacitors, to effectively equalize the received signal (e.g., without requiring calibration for active components). The linear equalizer also includes a level shifter that provides amplification and/or voltage level-shifting functions, wherein power from the level shifter is used to facilitate the selective frequency peaking of the passive network. In this way, the system effectively recycles the level-shifting power to perform equalization operations for communications across the channel.

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in, but are not limited to, application-specific integrated circuit (ASIC) chips, field-programmable gate arrays (FPGAs), and other programmable-logic devices.

What is claimed is:

1. An apparatus that equalizes a frequency response of a channel, comprising:
   a level shifter;
   a passive network to provide frequency peaking in a frequency range associated with a falling frequency response of the channel; and
   a channel interface to couple the passive network to the channel;
   Wherein the level shifter is coupled between the channel interface and the passive network, wherein the level shifter is an active component that provides at least one of an amplification function and a level-shifting function,
   wherein the level shifter includes a transconductance device, and
   wherein a feedback mechanism is to bias the transconductance device with respect to a conductance component of the passive network.

2. The apparatus of claim 1, wherein power from the level shifter facilitates the frequency peaking of the passive network.

3. The apparatus of claim 1, wherein the passive network implements a second order filter.

4. The apparatus of claim 3, wherein the second order filter is one of:
   a resistor-capacitor (RC) filter; and
   a resistor-inductor (RL) filter.

5. The apparatus of claim 3, wherein the second order filter is a π filter.

6. The apparatus of claim 1, wherein the apparatus implements one of:
   a transmitter; and
   a receiver.

7. The apparatus of claim 1, wherein the apparatus provides equalization for one of:
   a single-ended signal; and
   a double-ended signal.

8. An apparatus that equalizes a frequency response of a channel, comprising:
   a passive network to provide frequency peaking in a frequency range associated with a falling frequency response of the channel; and
   a level shifter coupled between the channel and the passive network;
   wherein the level shifter is an active component that provides at least one of an amplification function and a level-shifting function;
   wherein power from the level shifter facilitates the frequency peaking of the passive network;

wherein the level shifter comprises a resistance element coupled in series with a transconductance device, both coupled between a supply voltage terminal and a ground voltage terminal; and wherein the transconductance device is controlled by an input received from the channel.

9. The apparatus of claim 8, further comprising a feedback mechanism to bias the transconductance device with respect to a conductance component of the passive network.

10. The apparatus of claim 8, wherein the passive network is coupled in parallel with the resistance element.

11. The apparatus of claim 10, wherein:
the passive network comprises a first impedance network coupled in series with a second impedance network, both coupled between the supply voltage terminal and the transconductance device; and
the apparatus further comprises an output coupled to a junction between the first impedance network and the second impedance network.

12. The apparatus of claim 11, wherein:
the first impedance network comprises a first resistor coupled in parallel with an output capacitance; and
the second impedance network comprises a second resistor coupled in parallel with a second capacitor.

13. A method for equalizing a frequency response of a channel, comprising:
receiving an input signal from the channel;
filtering the input signal using a passive network to produce an output signal, wherein the filtering provides frequency peaking in a frequency range associated with a falling frequency response of the channel; and
using a level shifter to perform a level-shifting operation on the input signal before the input signal is filtered by the passive network, wherein the level shifter is an active component that provides at least one of an amplification function and a level-shifting function;
wherein the level shifter includes a transconductance device; and
wherein using the level shifter involves using a feedback mechanism to bias the transconductance device with respect to a conductance component of the passive network.

14. The method of claim 13, further comprising using power from the level shifter to facilitate the frequency peaking of the passive network.

15. The method of claim 13, wherein the passive network implements a second order filter.

16. An integrated circuit device comprising:
a passive network to provide frequency peaking at a frequency associated with a falling frequency response of an external channel;
a channel interface to couple the passive network to the external channel; and
a level shifter coupled between the channel interface and the passive network, wherein the level shifter is an active component that provides at least one of an amplification or a level-shifting function on an input signal before the input signal is filtered by the passive network;
wherein the level shifter includes a transconductance device; and
wherein a feedback mechanism is to bias the transconductance device with respect to a conductance component of the passive network.

17. The integrated circuit device of claim 16, wherein power from the level shifter facilitates the frequency peaking of the passive network.

18. The integrated circuit device of claim 16, wherein the passive network implements a second order filter.

19. The integrated circuit device of claim 16, wherein the passive network is part of a receiver on the channel.

20. The integrated circuit device of claim 16, wherein the passive network is part of a transmitter on the channel.

21. The integrated circuit device of claim 16, wherein the integrated circuit device is a memory device.

22. The integrated circuit device of claim 16, wherein the integrated circuit device includes a memory controller.

23. A integrated circuit device comprising:
a passive network to provide frequency peaking in a frequency range associated with a falling frequency response of an external channel; and
a level shifter coupled between the channel and the passive network;
wherein the level shifter is an active component that provides at least one of an amplification function and a level-shifting function;
wherein power from the level shifter facilitates the frequency peaking of the passive network; and
wherein the level shifter includes a transconductance device; and
wherein a feedback mechanism is to bias the transconductance device with respect to a conductance component of the passive network.

24. The integrated circuit device of claim 23, wherein the passive network implements a second order filter.

25. The integrated circuit device of claim 23, wherein the passive network is part of a receiver on the channel.

26. The integrated circuit device of claim 23, wherein the passive network is part of a transmitter on the channel.

27. An integrated circuit device, comprising:
a receiver to receive an input signal from the channel, wherein the receiver includes a level shifter and a passive network;
wherein the level shifter comprises a transconductance device coupled to the input signal, and a third resistor coupled in series with the transconductance device between a supply voltage terminal and a ground voltage terminal; and
wherein the passive network comprises, a first impedance network coupled between the supply voltage terminal and an output of the receiver, and a second impedance network coupled between the output of the receiver and a junction between the transconductance device and the third resistor.

28. The integrated circuit device of claim 27,
wherein the first impedance network comprises a first resistor coupled in parallel with an output load; and
wherein the second impedance network comprises a second resistor coupled in parallel with a second capacitor.

29. The integrated circuit device of claim 28, wherein values for the first resistor, the second resistor and the second capacitor are selected to provide frequency peaking in a frequency range associated with a falling frequency response of the channel.

30. The integrated circuit device of claim 27, wherein power from the level shifter facilitates frequency peaking of the passive network.

31. The integrated circuit device of claim 27, further comprising a feedback mechanism to bias the transconductance device with respect to a conductance component of the passive network.

* * * * *